UNITED STATES PATENT OFFICE.

NOAH WRINKLE, OF KEELER, AND WILFRED W. WATTERSON, OF BISHOP, CALIFORNIA.

PROCESS FOR OBTAINING POTASSIUM CHLORID FROM CERTAIN WATERS.

1,184,806. Specification of Letters Patent. Patented May 30, 1916.

No Drawing. Application filed December 15, 1915. Serial No. 66,943.

*To all whom it may concern:*

Be it known that we, NOAH WRINKLE and WILFRED W. WATTERSON, citizens of the United States, residing at Keeler and Bishop, respectively, both in the county of Inyo, State of California, have invented new and useful Improvements in Processes for Obtaining Potassium Chlorid from Certain Waters, of which the following is a specification.

This invention relates to methods of obtaining salts and dissolved minerals from certain waters, and particularly from such waters as occur in inland lakes, or from solutions formed by dissolving in water the salts deposited on the bottoms of dry lakes as a result of spontaneous evaporation; and the particular object of this invention is to provide a suitable process for obtaining potassium chlorid from such waters, although, as will be understood from this specification, our process also contemplates the extraction of other salts and is not specifically limited to the extraction of potassium chlorid.

In its general characteristics, our process comprises certain steps in which other soluble minerals are removed in sequence from the waters, and the separation of the potassium chlorid from the mother liquor. Waters designed to be treated by our process may and do contain such minerals as sodium chlorid, sodium carbonate, sodium bi-carbonate, sodium sulfate, sodium borate, potassium chlorid and other minerals. Our process is also applied to the separation and extraction of the different salts of lake deposits; said deposits being first dissolved in water to form such a solution as herein described, and the artificial solution being then treated in the same manner as a natural solution.

It may be first stated that, in general, there are two classes of waters to which our process is applied; one being that class in which there is not saturation with sodium chlorid, and the other being that class in which there is saturation with sodium chlorid; or, the two classes may be described by saying that the first is that class in which the total amount of sodium chlorid and potassium chlorid in solution is less than the total amount of all other minerals in solution, while the second class is that in which the total of said other minerals in solution is less than the total quantity of chlorids. The first mentioned class (to which most waters of inland lakes belong) are put through a preparatory step in our process, which step is not applied to the waters of the second class.

In order to make the following description as clear as possible, we shall describe our process as applied to a water of typical composition, it being understood, however, that such waters vary greatly in their compositions and that our process is applicable generally to any of them. Such a typical composition may be as follows:

Sodium chlorid_____ 4.63 per cent.
Sodium sulfate_____ 1.57 " "
Sodium carbonate____ 3.87 " "
Sodium bi-carbonate_ 0.60 " "
Potassium chlorid____ 0.40 " "

(1) Such a water as this belongs to the first mentioned class and is put through the preparatory step which consists of evaporation (preferably by sun heat) to concentrate the solution to a point where there is a saturated solution of sodium chlorid. In a saturated solution of the sodium chlorid, the sodium bi-carbonate is practically insoluble; and consequently, as a result of this concentration, the bi-carbonate is precipitated out in the form of trona or urao, in combination with a sufficient amount of sodium carbonate to form said compound—having a formula

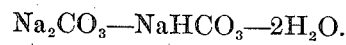

$$Na_2CO_3\text{—}NaHCO_3\text{—}2H_2O.$$

The concentration is continued until precipitation of sodium chlorid commences; that is, until a saturated solution of sodium chlorid is obtained, and when this point is reached the bi-carbonate, and a corresponding portion of carbonate, is practically completely precipitated. At the end of this preparatory step we then have a concentrated water having the original content of sodium chlorid and of sodium sulfate and of potassium chlorid, but having a reduced content of sodium carbonate and none of the original bi-carbonate. There are certain lakes in which this step of the process is carried on (substantially as herein set forth) by nature; and the second class of waters before mentioned is practically the same as the waters which we have at the end of this preparatory treatment of waters of the first class mentioned.

(2) The second step in our process is for the purpose of removing the carbonate; and this we accomplish by subjecting the solution to the action of carbon dioxid (obtained from any suitable source, as from a lime kiln or from a soda furnace wherein sodium bi-carbonate is liberating carbon dioxid in the process of conversion to sodium mono-carbonate). Carbon dioxid gas is brought into intimate contact with the solution in a suitable apparatus, as by being forced under pressure through the solution; and the solution is maintained at a temperature of from 95 to 100 degrees Fahrenheit. The treatment with carbon dioxid has the effect of converting the sodium carbonate into sodium bi-carbonate; and this treatment may be continued until all of the carbonate is so converted; but we find it efficient and economical to only partially treat the solution with the carbon dioxid until the quantity of remaining unchanged mono-carbonate is such that the amount of bi-carbonate which remains in solution at this temperature is sufficient to combine with the mono-carbonate to form urao. (In the average case, this means that more than half of the original mono-carbonate is precipitated out as bi-carbonate; which bi-carbonate may be removed by filtration.) The mono-carbonate and bi-carbonate are then combined to form urao by permitting the solution to evaporate and concentrate by solar heat. The urao is deposited from the solution, and the mother liquor is then drained off from the urao deposit, ready for the next step in the process. Or the urao may be formed and deposited during the next step (3) of our process, simultaneously with the deposition of the sodium chlorid and sodium sulfate. At this point in the process, after the carbonates have all been removed, there are still in the mother liquor the original quantities of sodium chlorid, of sodium sulfate and of potassium chlorid, the carbonates having been practically all eliminated.

(2ª) Now, in applying our process to the treatment of waters that have become saturated solutions, and that are naturally concentrated to that degree where the combined quantity of sodium chlorid and potassium chlorid already exists in greater amounts than the total amount of all the other soluble salts, and when further evaporation of such water would result first in the precipitation of sodium chlorid, there being a saturated solution of sodium chlorid, we may proceed as follows: The preliminary step above described is not applied to such waters, but such waters are directly treated with carbon-dioxid in the manner set forth above as the second step of our process; and this treatment with carbon dioxid may then be followed directly by a third step of our process (as described immediately hereinafter); without the necessity of any evaporation and concentration especially for the formation and deposition of the urao, said compound being formed and deposited during the next step of our process along with the deposition of sodium chlorid and sodium sulfate.

(3) The next step of our process has for its object the removal of a portion of the sodium chlorid and sodium sulfate from the mother liquor obtained from the preceding step. This is accomplished in evaporators heated by artificial heat; preferably in evaporators in which the liquid is progressively and gradually concentrated. This concentration is carried on, and the deposition of sodium chlorid and sodium sulfate is continued (and also the deposition of urao, in case the process is being carried on—as noted in the immediately preceding paragraph) until the potassium chlorid begins to deposit. This concentration may be carried on by sun's heat to a certain extent; but the final part of the concentration is preferably carried on in artificial evaporators to the point stated. When the potassium chlorid begins to deposit, evaporation is stopped. This point of concentration may be determined by removing from within the evaporators a portion of the precipitated salts freeing the removed salts from the mother liquor by washing with pure cold water, and subjecting the washed salts to the ordinary qualitative flame tests. When the presence of potassium is detected the concentration is stopped. This concentration within the evaporators is carried on at a temperature of approximately 200 degrees Fahrenheit; and at said temperature the potassium chlorid is more soluble than at a lower temperature.

(4) The next step in our process has for its object the final removal of the potassium chlorid. The removal is effected by cooling (by artificial means, if desired) the mother liquor, causing crystallization and deposition of the potassium chlorid. The potassium chlorid may be purified by dissolving in hot water and permitting the solution to slowly cool in suitable receptacles, depositing potassium chlorid sufficiently pure for commercial purposes. If necessary, the deposition may be caused by repeating steps (3) and (4) as many times as desired; alternately removing a further portion of the sodium chlorid and sulfate.

(5) The mother liquor may be used as a source for obtaining bromin when that element exists in sufficient quantities to justify recovery.

(3ª) When there are other minerals dissolved in the waters, it may be necessary to carry out a longer process consisting of more steps than above described. We have described our process as applied to a typical water; but there are some waters which contain a considerable quantity of sodium borate; and in such cases the borate must be removed before the potassium chlorid can be removed. We therefore, in such a case, proceed as follows: In the third step of our process, concentration of the liquid is carried on in the manner described until the borate begins to deposit. Said concentration may be carried on by solar heat to a certain point, but before the borate begins to deposit the liquor is introduced into multiple effect evaporators and therein artificially heated under control. The precipitation of the borate is detected by the ordinary flame test. The liquid is then allowed to cool in suitable receptacles, causing the deposition of the borate on hangers suspended in the liquid and on the bottom and the sides of the cooling receptacle. Artificial cooling may be resorted to for the purpose of more fully depositing the borate. The next step is then the further evaporation and concentration of the liquid, in the manner explained in (3), preferably in multiple effect evaporators with artificial heat, causing a further deposition of the sodium chlorid and sodium sulphate; and this concentration is carried on until the potassium chlorid begins to deposit (as explained hereinbefore).

(4ª) The potassium chlorid is then deposited by cooling and crystallization as hereinbefore explained in (4). It will be understood that, for depositing the potassium chlorid, we may alternately evaporate and cool the liquid several times, as often as necessary to recover the desired percentage of potassium chlorid from the mother liquor. Cooling by artificial refrigeration may also be resorted to.

While our process is primarily devised for the recovery of potassium chlorid from natural waters of the class described, it will be seen that in the practical operation of our process, other substances are recovered; and we accordingly do not limit our process specifically and entirely to the recovery of potassium chlorid alone.

Having described our invention, we claim:

1. The herein described process of treating waters containing sodium chlorid, sodium sulfate, sodium carbonate, and potassium chlorid, embodying first treating the water with carbon dioxid to transform a part of the carbonate to sodium bi-carbonate, said treatment being carried on at a temperature at which the bi-carbonate is partially soluble in the water and being carried on to that degree where the remaining unchanged carbonate is just sufficient to combine with the bi-carbonate in solution to form urao, then forming urao of the bi-carbonate and carbonate by evaporation, separating the urao from the liquor and then removing the remaining salts from the resultant liquor by concentration and cooling.

2. The herein described process of treating waters containing sodium chlorid, sodium sulfate, sodium carbonate, and potassium chlorid, embodying first treating the water with carbon dioxid to transform a part of the carbonate to sodium bi-carbonate, said treatment being carried on at a temperature at which the bi-carbonate is partially soluble in the water and being carried on to that degree where the remaining unchanged carbonate is just sufficient to combine with the bi-carbonate in solution to form urao, then forming urao of the bi-carbonate and carbonate by evaporation, separating the urao from the liquor then evaporating and concentrating the resultant liquor at a relatively high temperature, and then cooling to a lower temperature to precipitate the remaining salts.

3. The herein described process of treating waters containing sodium chlorid, sodium sulfate, sodium carbonate, and potassium chlorid, embodying first treating the water with carbon dioxid to transform a part of the carbonate to sodium bi-carbonate, said treatment being carried on at a temperature at which the bi-carbonate is partially soluble in the water and being carried on to that degree where the remaining unchanged carbonate is just sufficient to combine with the bi-carbonate in solution to form urao, then forming urao of the bi-carbonate and carbonate by evaporation, separating the urao from the liquor then evaporating and concentrating the resultant liquor at a high temperature to precipitate sodium chlorid and sodium sulfate therefrom, removing the said chlorid and sulfate, and then cooling the liquor to precipitate the potassium chlorid.

4. The herein described process of treating waters containing sodium chlorid, sodium sulfate, sodium carbonate, and potassium chlorid, embodying first treating the water with carbon dioxid to transform a part of the carbonate into sodium bi-carbonate, said treatment being carried on at a temperature such that the bi-carbonate is partially soluble in the water and being carried on to that degree where the unchanged carbonate is just sufficient to combine with the bi-carbonate remaining in solution to form urao, then causing combination of the bi-carbonate in solution with the remaining carbonate to form urao, evaporating and concentrating the resultant liquor at a relatively high temperature to precipitate sodium chlorid and sodium sulfate therefrom, removing the sodium salts precipitated, and then cooling the liquor to precipitate the potassium chlorid.

5. The herein described process of treating waters containing sodium chlorid, sodium sulfate, sodium carbonate and potassium chlorid, embodying first treating the water with carbon dioxid to form a part of the carbonate into sodium bi-carbonate, said treatment being carried on at a temperature such that the bi-carbonate is partially soluble in the water and being carried on to that degree where the unchanged carbonate is just sufficient to combine with the bi-carbonate remaining in solution to form urao, subjecting the resultant liquor to solar heat to cause the bi-carbonate in solution to combine with the remaining carbonate to form a deposition of urao, evaporating and concentrating the resultant liquor at a relatively high temperature to precipitate sodium chlorid and sodium sulfate, said concentration being carried to the point where the potassium chlorid commences to precipitate, removing the sodium salts precipitated, and then cooling the resultant liquor to a relatively low temperature to crystallize out the potassium chlorid.

6. The herein described process of treating waters containing sodium chlorid, sodium sulfate, sodium carbonate, and potassium chlorid, and sodium borate, embodying first treating the water with carbon dioxid to form a part of the carbonate into sodium bi-carbonate, said treatment being carried on at a temperature such that the bi-carbonate is partially soluble in the water and being carried on to that degree where the unchanged carbonate is just sufficient to combine with the bi-carbonate remaining in solution to form urao, subjecting the resultant liquor to solar heat to cause the bi-carbonate in solution to combine with the remaining carbonate to form a deposition of urao, evaporating and concentrating the resultant liquor at a relatively high temperature to precipitate sodium chlorid and sodium sulfate, said concentration being carried to the point where the sodium borate commences to precipitate, removing the sodium salts precipitated, cooling the liquor to a relatively low temperature to crystallize out the sodium borate, again evaporating and concentrating the resultant liquor at a relatively high temperature to precipitate more of the sodium chlorid and sodium sulfate, said concentration being carried to the point where the potassium chlorid commences to precipitate, removing the sodium salts precipitated, and then cooling the resultant liquor to a relatively low temperature to crystallize out the potassium chlorid.

7. The herein described process of treating waters containing sodium chlorid, sodium sulfate, sodium carbonate, sodium bi-carbonate, and potassium chlorid, and wherein there is not a saturated solution of sodium chlorid, comprising first evaporating and concentrating the liquid to combine the bi-carbonate and a part of the carbonate to form and deposit urao, treating the resultant liquor with carbon dioxid to transform a part of the carbonate into sodium bi-carbonate, said treatment being carried on at a temperature such that the bi-carbonate is partially soluble in the water and being carried on to that degree where the unchanged carbonate is just sufficient to combine with the bi-carbonate remaining in solution to form urao, subjecting the resultant liquor to solar heat to cause the bi-carbonate in solution to combine with the remaining carbonate to form a deposition of urao, evaporating and concentrating the resultant liquor at a relatively high temperature to precipitate sodium chlorid and sodium sulfate, said concentration being carried to the point where the potassium chlorid commences to precipitate, removing the precipitated sodium salts, and then cooling the resultant liquor to a relatively low temperature to crystallize out the potassium chlorid.

8. The herein described process of treating water containing sodium carbonate to remove the carbonate from solution, embodying first treating the solution with carbon dioxid to transform a part of the carbonate into sodium bi-carbonate, said treatment being carried on at a temperature such that the bi-carbonate formed is partially soluble in the water and being carried to that degree where the remaining unchanged carbonate is just sufficient to be combined with the bi-carbonate in solution to form urao, forming urao of the remaining carbonate and the dissolved bi-carbonate by evaporation, and then removing the deposit of urao.

In witness that we claim the foregoing we have hereunto subscribed our names this 10th day of December, 1915.

NOAH WRINKLE.
WILFRED W. WATTERSON.

Witnesses:
JAMES T. BARKELEW,
ELWOOD H. BARKELEW.